US010973062B2

(12) United States Patent
Sadhu et al.

(10) Patent No.: US 10,973,062 B2
(45) Date of Patent: Apr. 6, 2021

(54) METHOD FOR EXTRACTING ENVIRONMENT INFORMATION LEVERAGING DIRECTIONAL COMMUNICATION

(71) Applicant: International Business Machines Corporation, Armonk, NY (US)

(72) Inventors: Bodhisatwa Sadhu, Peekskill, NY (US); Alberto Valdes Garcia, Chappaqua, NY (US); Supriyo Chakraborty, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 16/550,849

(22) Filed: Aug. 26, 2019

(65) Prior Publication Data

US 2021/0068170 A1 Mar. 4, 2021

(51) Int. Cl.
*H04W 76/10* (2018.01)
*H04W 72/08* (2009.01)
*H04W 72/04* (2009.01)
*G06N 5/04* (2006.01)
*H04W 4/02* (2018.01)
(Continued)

(52) U.S. Cl.
CPC .............. *H04W 76/10* (2018.02); *G06N 5/04* (2013.01); *G06N 20/00* (2019.01); *H04W 4/023* (2013.01); *H04W 4/33* (2018.02); *H04W 16/28* (2013.01); *H04W 72/046* (2013.01); *H04W 72/082* (2013.01)

(58) Field of Classification Search
CPC . H04W 76/10; H04W 72/082; H04W 72/046; H04W 4/023; H04W 4/33; H04W 16/28; G06N 5/04; G06N 20/00
See application file for complete search history.

(56) References Cited

U.S. PATENT DOCUMENTS 5,128,683 A 7/1992 Freedman et al.
6,975,267 B2 12/2005 Stenger et al.
(Continued)

FOREIGN PATENT DOCUMENTS

CN 109462430 A 3/2019
EP 0 600 715 A2 6/1994
(Continued)

OTHER PUBLICATIONS

Mozaffari et al.; "Beyond 5G With UAVs: Foundations of a 3D Wireless Cellular Network", Cornell University Library, arXiv:1805.06532v2, Nov. 2, 2018, pp. 1-32.
(Continued)

*Primary Examiner* — Robert J Lopata
(74) *Attorney, Agent, or Firm* — Scully, Scott, Murphy & Presser, PC; Daniel P. Morris, Esq.

(57) ABSTRACT

Generating an environment information map from a wireless communication system having directional communication capabilities. A plurality of features are extracted and logged resultant from a communication link attempt at multiple beam directions and training at least one machine learning model based on the plurality of extracted features from the first beam direction and the at least one additional beam directions to infer an environment information map of the area between the first transmitter and the receiver.

20 Claims, 9 Drawing Sheets

(51) Int. Cl.
*H04W 4/33* (2018.01)
*G06N 20/00* (2019.01)
*H04W 16/28* (2009.01)

(56) References Cited

U.S. PATENT DOCUMENTS

| | | | |
|---|---|---|---|
| 7,916,081 | B2 | 3/2011 | Lakkis |
| 8,103,312 | B2 | 1/2012 | Khojastepour |
| 9,369,849 | B2 | 6/2016 | Liu et al. |
| 9,531,086 | B1 | 12/2016 | Bulzacchelli et al. |
| 9,853,704 | B2 | 12/2017 | Kang et al. |
| 9,869,753 | B2 | 1/2018 | Eldada |
| 9,985,709 | B2 | 5/2018 | Park et al. |
| 10,009,905 | B2 | 6/2018 | Kakishima et al. |
| 10,044,477 | B2 | 8/2018 | Ding |
| 10,158,554 | B1 * | 12/2018 | Bae .................. H04W 40/24 |
| 10,171,154 | B2 | 1/2019 | Kim et al. |
| 2005/0122999 | A1 | 6/2005 | Scherzer et al. |
| 2007/0225041 | A1 * | 9/2007 | Bi ........................ H04B 7/10 455/562.1 |
| 2008/0316103 | A1 * | 12/2008 | Rofougaran .......... G01S 13/426 342/386 |
| 2010/0103900 | A1 | 4/2010 | Yeh et al. |
| 2010/0232529 | A1 * | 9/2010 | Fettweis ............ H04B 7/0413 375/260 |
| 2015/0245251 | A1 | 8/2015 | Somayazulu et al. |
| 2016/0165605 | A1 | 6/2016 | Dimou et al. |
| 2017/0339678 | A1 | 11/2017 | Wei et al. |
| 2018/0139623 | A1 * | 5/2018 | Park .................. H04B 17/3913 |
| 2018/0213413 | A1 | 7/2018 | Roy et al. |
| 2018/0294855 | A1 | 10/2018 | Ko et al. |
| 2019/0037426 | A1 | 1/2019 | Yu et al. |
| 2019/0090220 | A1 | 3/2019 | Li et al. |
| 2019/0342763 | A1 * | 11/2019 | Jung .................... G06T 17/05 |
| 2019/0387421 | A1 * | 12/2019 | Cho .................... H04B 17/24 |
| 2020/0252318 | A1 * | 8/2020 | Kleider ............ H04B 17/0085 |

FOREIGN PATENT DOCUMENTS

| | | |
|---|---|---|
| WO | 2018221829 A | 12/2018 |
| WO | 2019029802 A | 2/2019 |

OTHER PUBLICATIONS

Liu et al.; "Analysis of frequency-Dependent Line-of-Sight Probability in 3-D Environment", IEEE Communications Letters, vol. 22, No. 8, Aug. 2018, pp. 1732-1735.

Kovalchukov et al.; "Evaluating SIR in 3D mmWave Deployments: Direct Modeling and Feasible Approximations", IEEE Transactions on Wireless Communications, vol. 18, Issue 2, Feb. 2019, pp. 879-896.

Giordani et al.; "Multi-Connectivity in 5G mmWave Cellualr Networks", Mediterranean Ad Hoc Networking Workshop (Med-Hoc-Net), Jun. 20-22, 2016, pp. 1-7.

Abdullah, et al., "Effect of Beamforming on mmWave Systems in Various Realistic Environments", 2017 IEEE 85th Vehicular Technology Conference, VTC Spring 2017—Proceedings Publisher Institute of Electrical and Electronics Engineers Inc., Jun. 2017, pp. 1-5.

Sadhu, et al, "A 28-GHz 32-element TRX phased-array IC with concurrent dual-polarized operation and orthogonal phase and gain control for 5G communications", IEEE Journal of Solid-State Circuits, Dec. 2017, 52(12), pp. 3373-3391.

Sadhu, et al., A., "128-element Dual-Polarized Software-Defined Phased Array Radio for mm-wave 5G Experimentation", In Proceedings of the 2nd ACM Workshop on Millimeter Wave Networks and Sensing Systems Oct. 2018, pp. 21-25. ACM.

Gharaibeh, et al., "Accurate Estimation of Digital Communication System Metrics—SNR, EVM and $\rho$ in a Nonlinear Amplifier Environment", IEEE, 64th ARFTG Microwave Measurements Conference, Fall 2004, Dec. 2-3, 2004, pp. 1-4.

Aladsani,, et al., "Leveraging mmWave Imaging and Communications for Simultaneous Localization and Mapping", Nov. 17, 2018, IEEE ICASSP 2019, pp. 1-4.

Dahlman et al, "5G Radio Access", Ericssson Review, Jun. 18, 2014, pp. 1-8.

Sunathillake, e al., "Topology Maps for 3D Millimeter Wave Sensor Networks with Directional Antennas", IEEE 42nd Conference on Local Computer Networks, Oct. 9-12, 2017, pp. 453-.

Rah, et al., "Millimeter-Wave Beamforming as an Enabling Technology for 5G Cellular Communications: Theoretical Feasibility and Prototype Results", IEEE Communications Magazine • Feb. 2014, pp. 106-113.

Sadhu et al, "A Software-Defined Phased Array Radio with mmWave to Software Vertical Stack Integration for 5G Experimentation", 2018 IEEE/MTT-S International Microwave Symposium, Jun. 10-15, 2018, pp. 1323-1326.

* cited by examiner

US 10,973,062 B2

METHOD FOR EXTRACTING ENVIRONMENT INFORMATION LEVERAGING DIRECTIONAL COMMUNICATION

BACKGROUND OF THE INVENTION

The present invention is directed to cellular communications and more particularly to using directional communication capabilities to enable environment sensing and mapping.

Current environment sensing systems such as those using radar are not usable in a cellular communication system because such radar systems do not have communications functions and do not have access to a radio access network or radio network metadata. In addition, such radar systems need separate infrastructure deployment and therefore cannot leverage cellular infrastructure.

SUMMARY OF THE INVENTION

One embodiment of the present disclosure is directed to a computer implemented method for generating an environment information map using a wireless communication system that includes at least one transmitter and at least one receiver, where at least one of the transmitter and receiver having a directional communication system. The method includes the steps of attempting a wireless communication link by transmitting a signal from a first transmitter to a receiver in a first beam direction, extracting a plurality of features resultant from the link attempt for the first beam direction and logging the plurality of extracted features at the receiver, attempting at least one additional wireless communication link from the first transmitter to the receiver by transmitting a signal in a respective at least one additional beam direction extracting a plurality of features resultant from each of the at least one additional link attempts for each of the at least one additional beam directions and logging the plurality of extracted features at the receiver and training at least one machine learning model based on the plurality of extracted features from the first beam direction and the at least one additional beam directions to infer an environment information map of the area between the first transmitter and the receiver.

A computer system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

In one embodiment, a wireless communication system leverages directional communication capabilities to enable environment sensing and mapping. The principles outlined in this disclosure apply to any wireless communication system in which at least one of the transmitter and receiver in the link has directional communication capabilities. The sensing and mapping may be 2D or 3D. The method may provide relative locations of both reflecting surfaces, such as buildings, as well as obstructions that are not reflectors but provide attenuation, such as a tree. One such wireless communication systems is a cellular communications system that includes at least one base station that communicates with a user equipment device. One such system utilizes mmWave 5G cellular communications technology. Beamforming algorithms, for example, are used to efficiently create communication links in cellular communication systems with directional communication capabilities. The advantage of directional communications or mmWave frequencies is used to improve the granularity and resolution of the environment sensing and mapping. Another example is a 60-GHz WLAN communication system. These systems were developed for high-speed (~1 Gb/s) wireless communication within a room. In this case the result is an indoor environment estimation.

Figure 1:
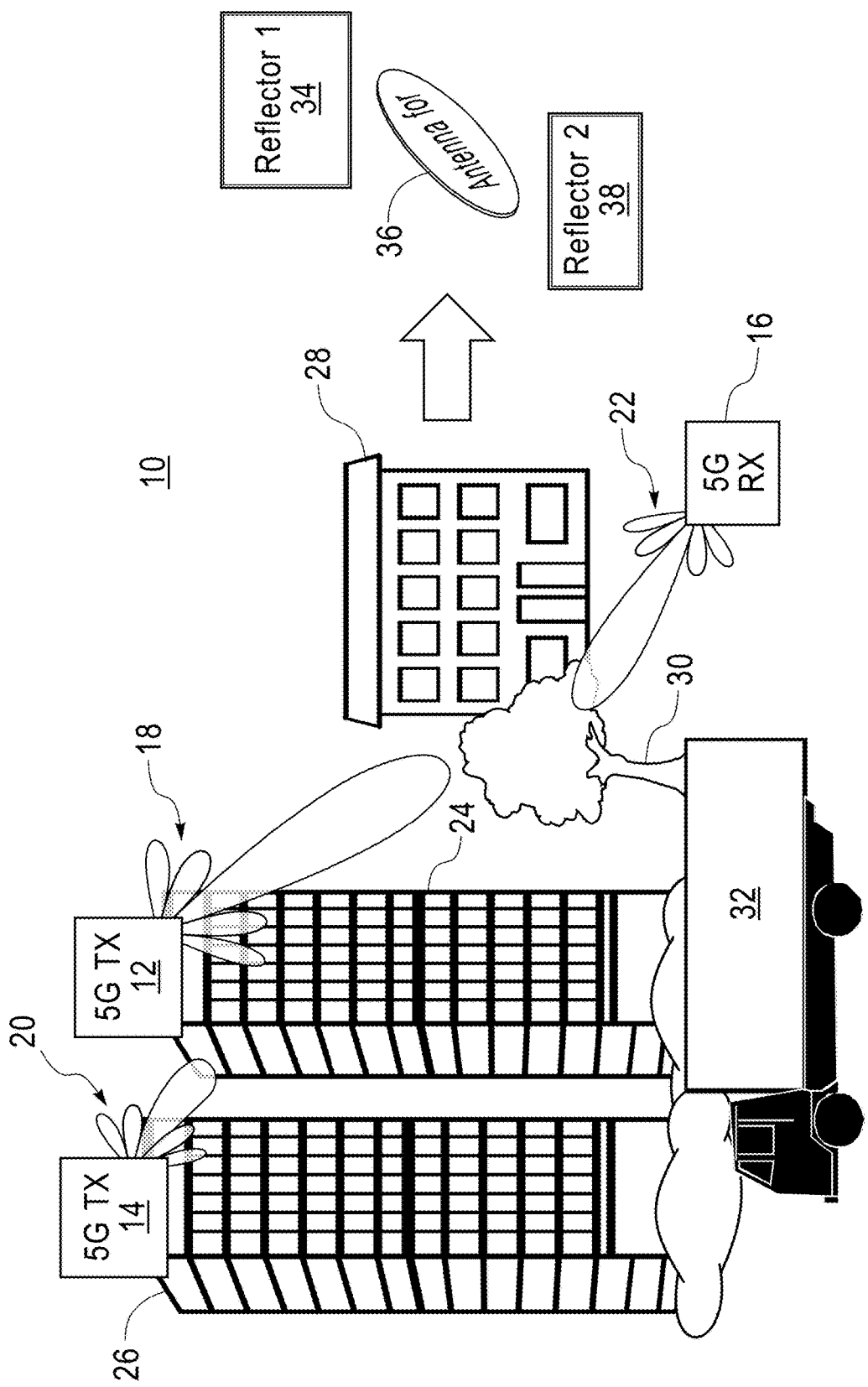
FIG. 1 is a block diagram of one embodiment of the system disclosed in this specification.

In one embodiment, as shown in FIG. 1, a cellular communication system 100 consists of one or more base stations and one or more user equipment. In the example of FIG. 1, two base stations 12 and 14 and one user equipment 16 are shown. Either or both of the base stations 12 and 14 and the user equipment 16 may include directional communication capabilities. In the example of FIG. 1 the base stations 12 and 14 have the capability to control the direction of multiple beams 18 and 20 and user equipment 16 has the capability to control the direction of multiple beams 22. The directional capabilities may be provided by beamforming, beam-steering, beam-shaping or other directional beam technologies. In the example of FIG. 1, the base station 12 is a mmWave 5G transmitter in an upper floor of a building 24 and the base station 14 is a mmWave 5G transmitter in an upper floor of a building 26. Objects in the environment between the base stations 12, 14 and user equipment 16 include a building 28, tree 30 and truck 32.

In one embodiment of the method of the present disclosure, a first base station 12 sends the beam 18 in a given beam direction to instruct the user equipment 16 to attempt to form a cellular communication a link. The user equipment 16 attempts to make the communication link using beam 22 in the given beam direction. The user equipment 16 extracts and logs a plurality of features for that direction resultant from the link attempt. The features may include communication link metrics such as error vector magnitude (EVM), bit error rate (BER), received signal strength indicator (RSSI), signal-to-noise ratio (SNR), waveform quality factor and signal-to-interference ratio (SIR). For example, a uniform degradation of link quality (as measured by EVM) or uniform attenuation (as measured by a received signal strength indicator RSSI) in several link directions in one polarization may indicate the presence of rain. Other features and metrics resultant from the link attempt, such as the channel frequency response and delay spread, may also be extracted and logged.

The communication link attempts between the first base station 12 and the user equipment 16 are repeated for additional beam directions that the user equipment 16 is capable of forming a beam in. In one embodiment, links may be attempted for all the directions that the user equipment 16 is capable of forming a beam in. The user equipment 16 extracts and logs the plurality of features for the additional beam directions resultant from the link attempts.

In one embodiment, all of the communication link attempts between the first base station 12 and the user equipment 16 for all the directions may be repeated for a different output power from the user equipment 16 and/or a different output power from the first base station 12. The user equipment 16 extracts and logs the plurality of features resultant from the link attempts at the different output power.

In one embodiment, all of the communication link attempts between the first base station 12 and the user equipment 16 for all the directions may be repeated for a different amplitude tapering from the user equipment 16 and/or a different amplitude tapering from the first base station 12. The user equipment 16 extracts and logs the plurality of features resultant from the link attempts at the different output power. Independent phase and gain control may be used at each antenna element for beam forming control.

In one embodiment, all the communication link attempts between the first base station 12 and the user equipment 16 for all the directions may be repeated for one or more additional antenna polarizations. For example, communication links may be attempted in which both the first base station 12 and the user equipment 16 have vertical polarizations, then in which both the first base station 12 and the user equipment 16 have horizontal polarizations and then in which the first base station 12 has a horizontal polarization and the user equipment 16 has a vertical polarization and vise versa. The user equipment 34 extracts and logs the plurality of features resultant from the link attempts at the different polarizations.

In one embodiment, communication links are attempted by the second base station 14 that has access to the same user equipment 16 for a given beam direction of beam 20. In one embodiment, communication link attempts between the second base station 14 and the same user equipment 16 may be repeated for some or all additional directions that the user equipment 16 is capable of forming a beam in. In one embodiment all the communication link attempts between the second base station 14 and the same user equipment 16 for all the directions may be repeated for one or more of different output power and additional antenna polarizations. The user equipment 16 extracts and logs the plurality of features resultant from the link attempts from the second base station 14. In this embodiment, features are collected from a different area of the relevant environmental space. Thus, a rich set of feature information is formed for multiple beam directions, power levels, polarizations and base station locations.

An algorithm converts this set of feature information into inferred 3D environment information such as the presence of walls, buildings and/or foliage. In one embodiment, change in weather conditions may be inferred. Unlike prior art methods based on communication with the detected entities, the present method is capable of extracting information about non-communicating entities in the environment. The inferred environment may include inferred object 34 of the building 28, an inferred object 36 of the tree 30 and an inferred object 38 of truck 32. The method provides relative locations of both reflecting surfaces of the building 38 and the truck 42, as well as obstructions that are not reflectors but provide attenuation such as the tree 40.

Figure 2:
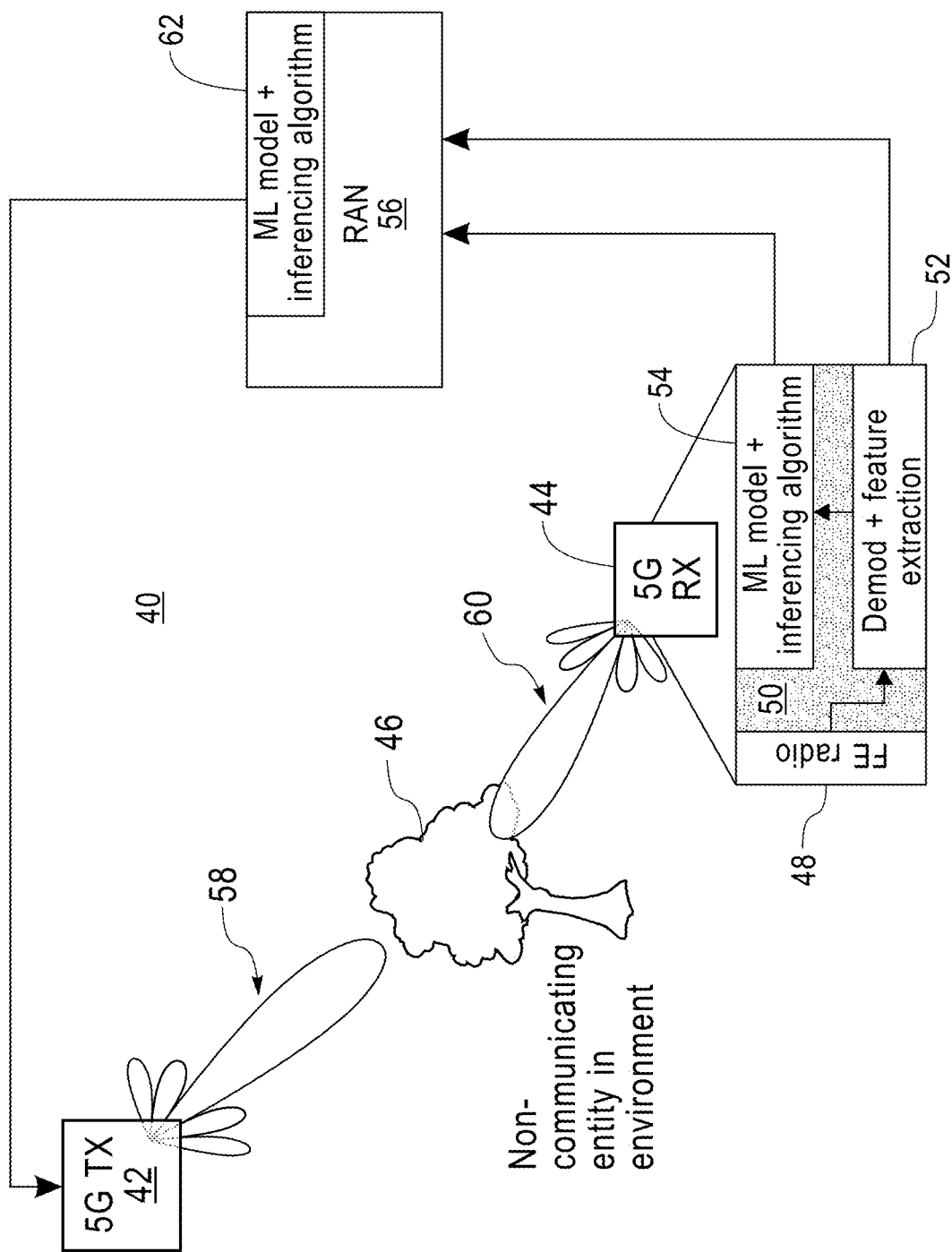
FIG. 2 is a block diagram of one embodiment of the system disclosed in this specification.

FIG. 2 is an example of one embodiment of a system 40 for environment sensing and mapping according to the present disclosure. The system 40 includes a mmWave 5G transmitter (TX) 42 and a mmWave 5G receiver (RX) 44. The TX 42 and RX 44 can both be base-stations, user equipment, or any other device capable of directional communications. A non-communicating entity such as tree 46 is in the environment.

In one embodiment, the system 40 includes a machine learning based intelligent sensing mapping system that leverages directional communication capabilities of the TX 42 and RX 44. Various machine learning algorithms can be used, such a regression, structured and unstructured, supervised and unsupervised, reinforced learning and Bayesian learning.

In an embodiment, the RX 44 in system 40 includes a front end (FE) radio 48 and a computer processing system 50. The computer processing system 50 includes a demodulation and feature extraction module 52 and a machine learning model and inferencing algorithm module 54. The system 40 also includes radio access network (RAN) 56. The FE 48 communicates with the computer processing system 50 and the RAN 56. The TX 42 and RX 44 perform directional communication using one or more beams 58 and 60, respectively. The RX 44 in the FE 48 receives the signals transmitted from the TX 42 and module 52 demodulates and performs feature extraction. Typical receiver demodulation hardware is used to obtain the raw data from the incoming waveforms. Signal processing hardware analyzes the raw data and extracts the features. The features may be in the form of the various communication link metrics. The extracted features may also include Fourier Transform coefficients, coefficients of other mathematical transforms, or other features that may be as a result of the particular environment under consideration. A neural network may also be used for feature extraction. Relevant features can also be extracted prior to demodulation, for example the amplitude of the received signal as estimated by a Received Signal Strength Indicator (RSSI).

The features are locally used by the machine learning model and inferencing algorithm module 54 within the RX 44 to perform 2D or 3D model scoring to create a 2D or 3D inference map. In one embodiment, the raw waveform is fed to the machine learning model and inferencing algorithm 54 in the RX 44 and the machine learning model and inferencing algorithm module 54 extracts the features.

The demodulated data, the extracted features and the 2D or 3D inferences are passed to the RAN 56. The RAN 56 uses the inferences to generate control signals for the TX 42 based on the 2D or 3D environment model. In one embodiment, the RAN 56 uses the inference information from the machine learning model and inferencing algorithm module 54 to perform application specific thresholding for generating of control signals.

In one embodiment, the RAN 56 has the memory and computational resources to include a machine learning model and inference algorithm module 62. The module 62 in one embodiment performs active learning. The RAN 56 expends the machine learning resources and temporary appropriation of TX 42 resources to modify the beamforming based on initial scores from the FE 88 machine learning model 54. Modifications may include more fine grained beamforming or scanning at a higher frequency. The module 62 may use sequence learning using temporal information extracted at the RAN 56 for higher level inferencing that leads to more detailed environment sensing. In one embodiment, the RAN 56 also uses the obtained information to improve its own machine learning model 62. In one embodiment, the RAN 56 periodically updates the machine learning model 54 on the FE 48. In another embodiment, the computer processing system 50 in the RX 44 does not have computing resources to perform feature extraction and inferencing tasks. In this case the demodulated data is communicated directly to the RAN where feature extraction and learning-based algorithm can be executed.

Figure 3A:
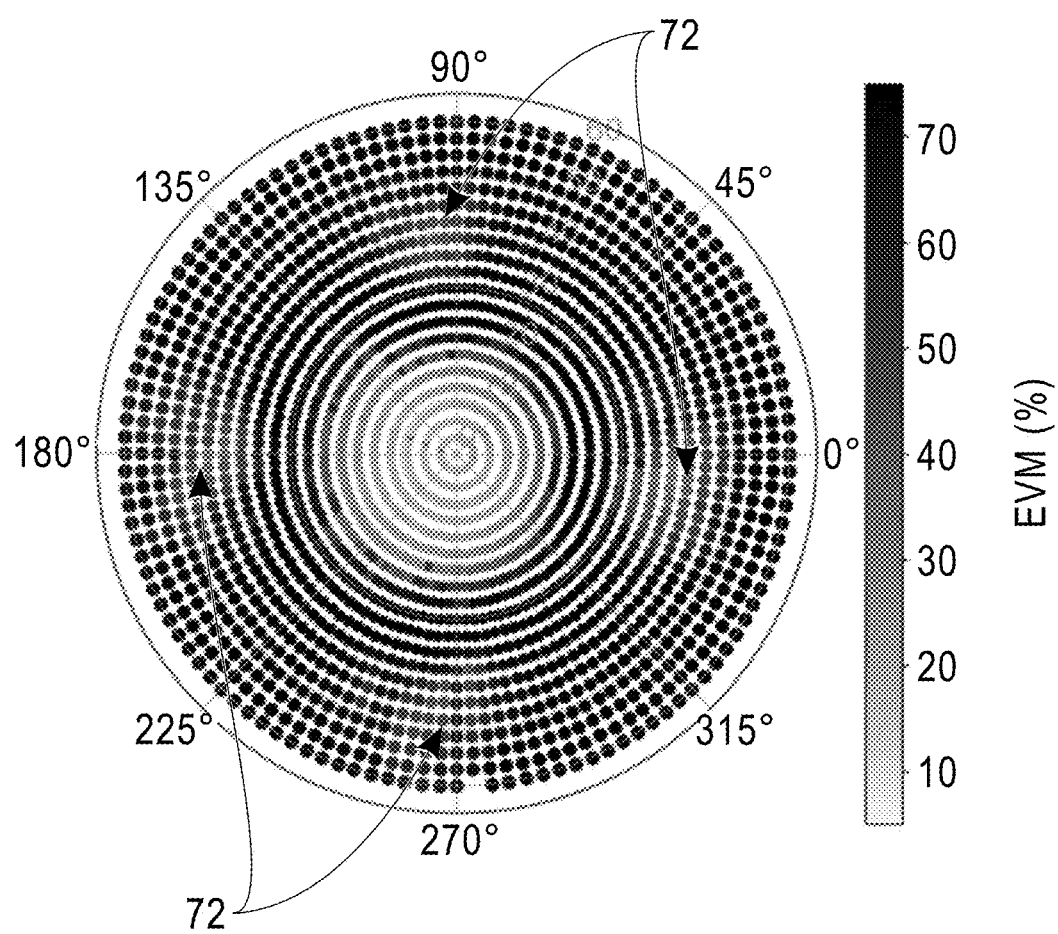
FIGS. 3A, 3B, 3C are examples of data graphs showing an EVM link metric from beamforming.
Figure 3B:
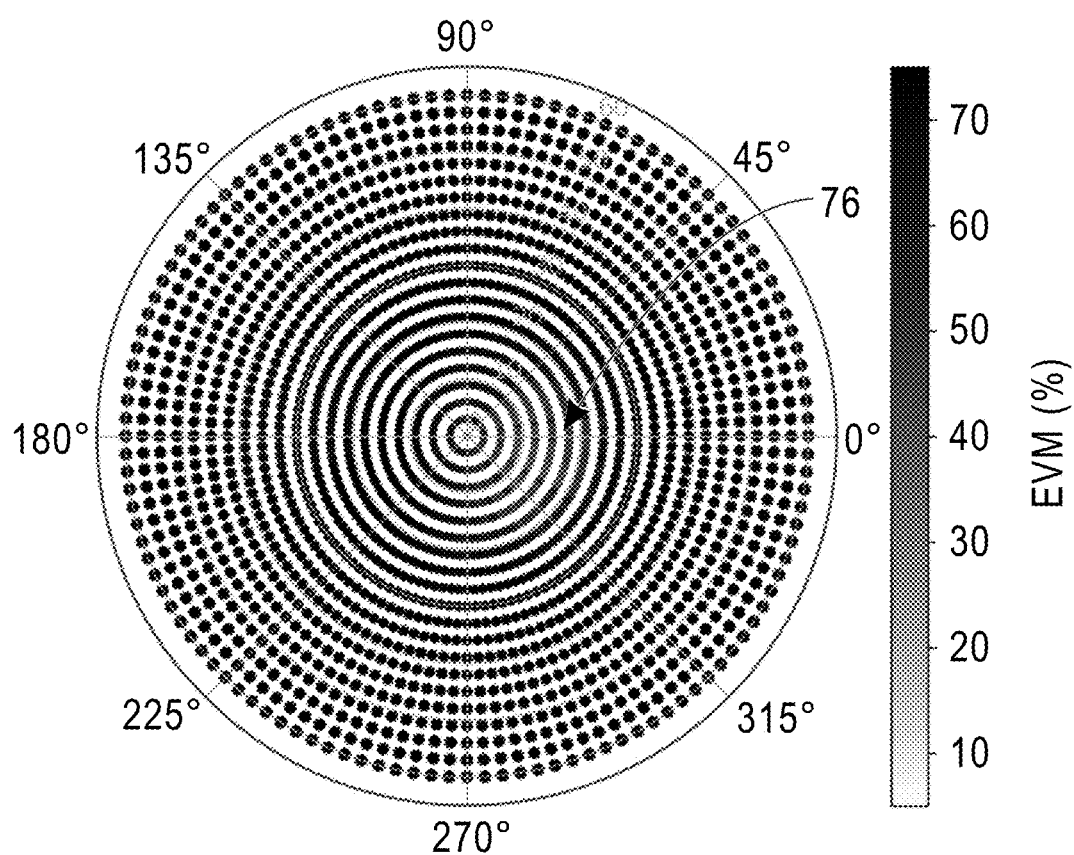
Figure 3C:
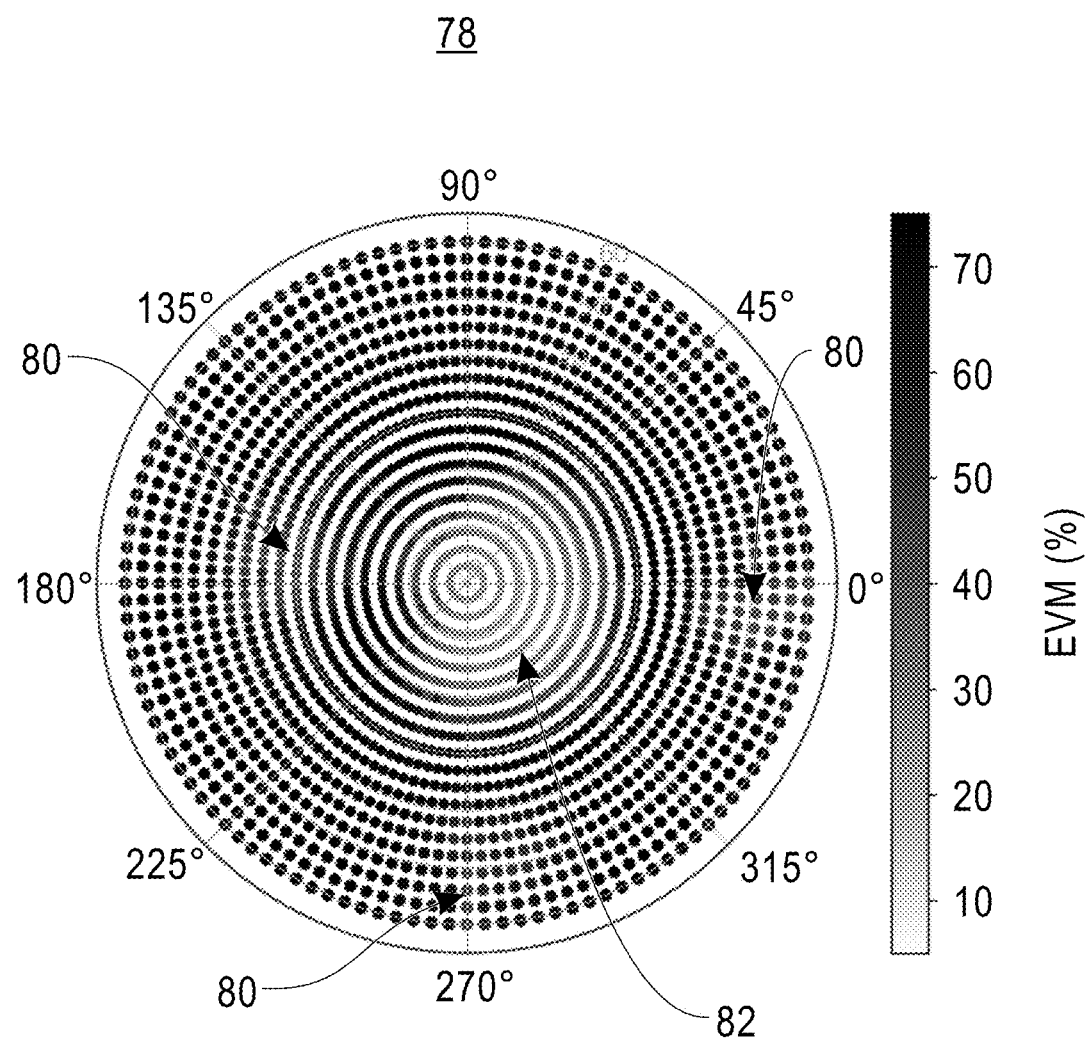

As indicated above, one type of feature that may be extracted from an attempted cellular communication link from a base station to a user equipment device are communication link metrics. One such communication link metric that may be extracted is error vector magnitude (EVM). For example, FIG. 3A shows an EVM data graphic 70 for a transmitter in a building having an equivalent isotropically radiated power (EIRP) of 14 dBm transmitting in a line of site path to a receiver sixty meters away that can be extracted by the demodulation and feature extraction module 52. Links formed when the main lobe is pointed at the transmitter, or any of the four side lobes are pointed at the transmitter 72 are visible in the data. In another example, for a one element transmitter having an EIRP of 10 dBm transmitting to a sixteen element receiver through a large tree may result in the error vector magnitude EVM data graphic 74 shown in FIG. 3B. The data result provides some sense of the environment, possibly including the kind of tree as shown at 76. By increasing the power by using a two element transmitter at 16 dBm EIRP transmitting to the same sixteen element receiver through the large tree may result in the error vector magnitude EVM data graphic 78 shown in FIG. 3C. Three lobes 80 can be seen and more details of the tree can be inferred at 82. This EVM data can be used by the ML model and inferencing algorithm 54 to generate a 2D or 3D environment map.

Various beamforming algorithms can be used that will result in the rich set of features extracted from the communications link attempts. In one example of a beamforming algorithm, that can be used as a tree search algorithm, includes a first stage of initialization that maintains a coarse sector codebook and a fine beam codebook at the transmitter, maintains a coarse sector codebook and a fine beam codebook at the receiver, transmits the transmitter-side codebook information to the receiver and the receiver feeds back the receiver-side codebook information to the transmitter. A second stage of coarse sector training includes for each possible pair of transmit sector i and receive sector j, transmit a training sequence with sector i and receive with sector j, and record the SNR as ½ (i; j). The receiver selects the best pair of transmit sector i ¤ and receive sector j ¤ such that the corresponding SNR is the largest and the receiver feedbacks the transmitter-side sector index i ¤. A third stage of fine beam training includes for each possible pair of transmit beam p within the coverage of sector i ¤ and receive beam q within the coverage of sector j ¤, transmit a training sequence with beam p and receive with beam q, and record the SNR as ½(i ¤; j ¤; p; q). The receiver selects the best pair of transmit beam p ¤ and receive beam q ¤ such that the corresponding SNR is the largest and the receiver feedbacks the transmitter-side beam index p ¤. The transmit beam p ¤ and receive beam q ¤ are to be used for data transmissions.

Other beamforming algorithms may be used in the present disclosure. One such further example is the Agile Link algorithm which includes creating a multi-armed beam in different orthogonal directions using subarrays, overlapping directions among different multi-armed beams provides information about the direction of arrival and estimate the direction of arrival using soft-voting to eliminate side-lobe effects. The system can pick multi-armed beams to create random hash functions and estimate the true direction using voting. Another example algorithm is a gradient descent based algorithm.

In one embodiment, the method of the present disclosure may be employed for micro-weather mapping. Mm-Wave channels are heavily dependent on weather. The amount and type of precipitation can be detected using differential attenuation measurements, such as live attenuation compared to attenuation during clear weather. Measurements are real-time and highly localized.

In one embodiment, the method may be employed for air pollution mapping. Mm-Wave channels may be dependent on air pollutants. Air quality can be detected using differential attenuation measurements, such as live attenuation compared to attenuation during clear low pollutant weather. Measurements are real-time and highly localized.

Figure 4:
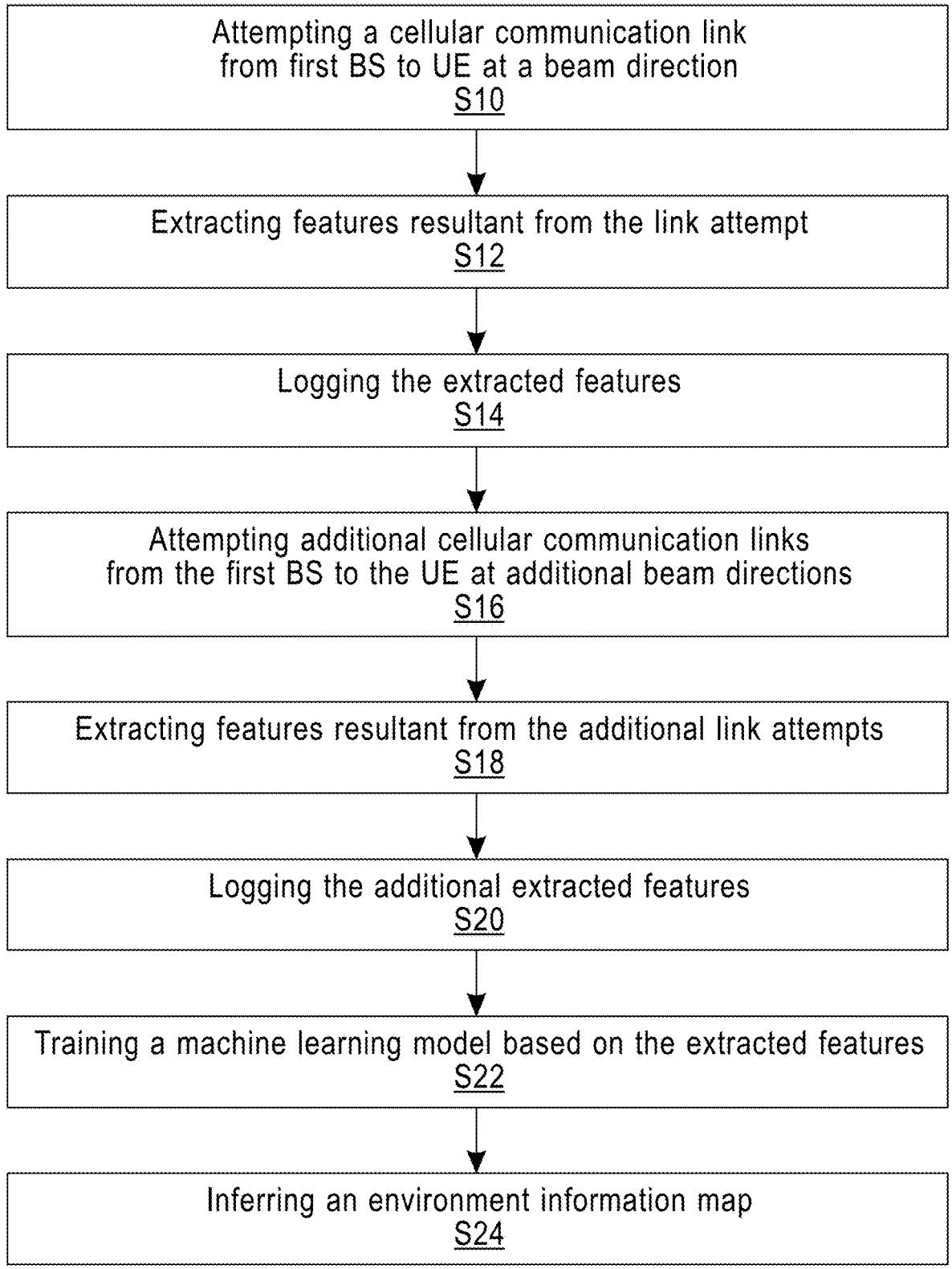
FIG. 4 is a flow diagram of one embodiment of the method disclosed in this specification.

FIG. 4 is flow diagram of one embodiment of a method according to the present disclosure. The method includes the steps of S10 attempting a cellular communication link from first BS to UE at a beam direction, S12 extracting features resultant from the link attempt, S14 logging the extracted features, S16 attempting additional cellular communication links from the first BS to the UE at additional beam directions, S18 extracting features resultant from the additional link attempts, S20 logging the additional extracted features, S22 training a machine learning model based on the extracted features and S24 inferring an environment information map.

Figure 5:
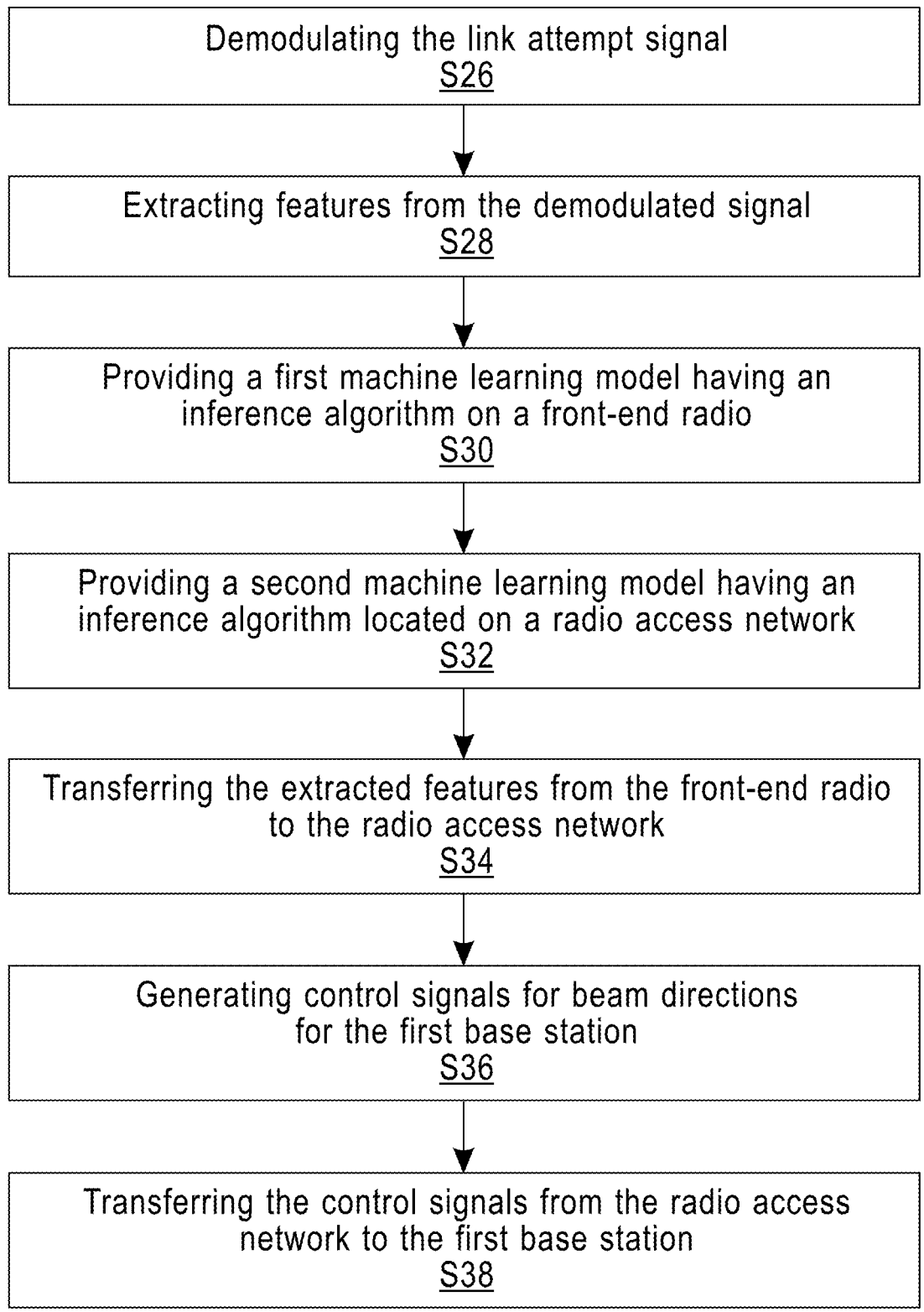
FIG. 5 is a flow diagram of one embodiment of the method disclosed in this specification.

FIG. 5 is flow diagram of one embodiment of a method according to the present disclosure. The method includes the steps of S26 demodulating the link attempt signal, S28 extracting features from the demodulated signal, S30 providing a first machine learning model having an inference algorithm on a front end radio, S32 providing a second machine learning model having an inference algorithm located on a radio access network, S34 transferring the extracted features from the front-end radio to the radio access network, S36 generating control signals for beam directions for the first base station and S38 transferring the control signals from the radio access network to the first base station.

Figure 6:
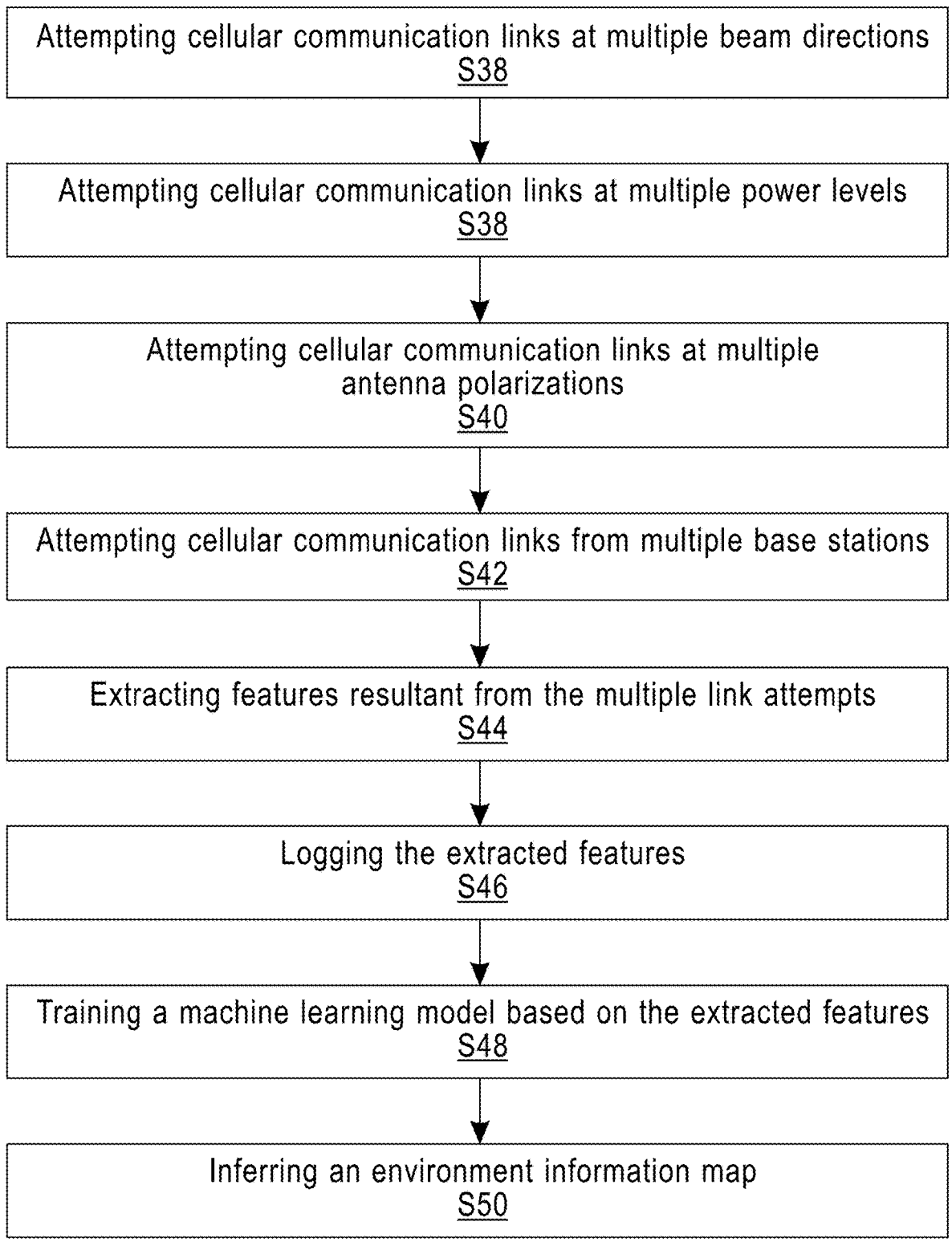
FIG. 6 is a flow diagram of one embodiment of the method disclosed in this specification.

FIG. 6 is flow diagram of one embodiment of a method according to the present disclosure. The method includes the steps of S38 attempting cellular communication links at multiple beam directions, S38 attempting cellular communication links at multiple power levels, S40 attempting cellular communication links at multiple antenna polarizations, S42 attempting cellular communication links from multiple base stations, S44 extracting features resultant from the multiple link attempts, S46 logging the extracted features, S48 training a machine learning model based on the extracted features and S50 inferring an environment information map.

Figure 7:
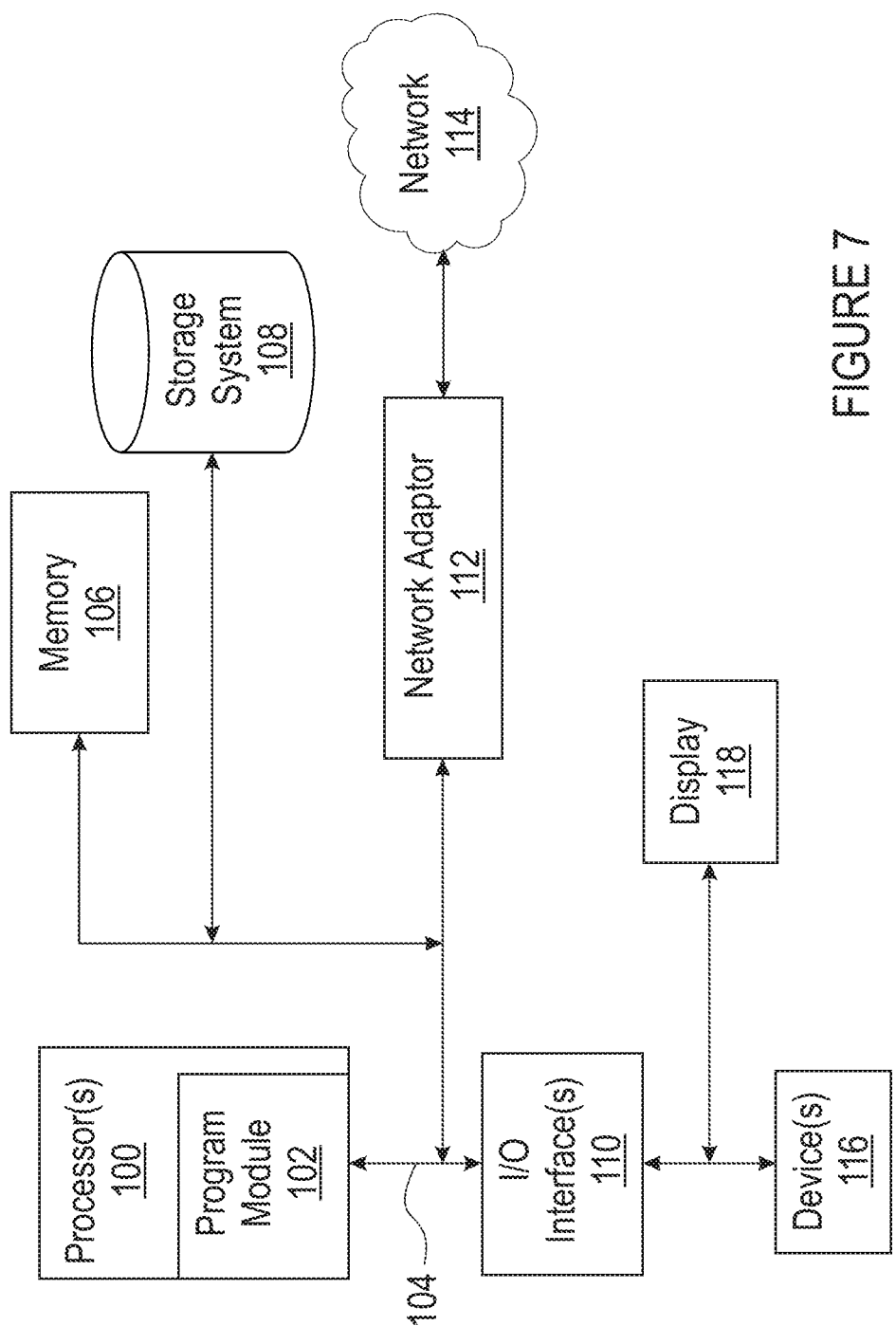
FIG. 7 is a block diagram of an exemplary computing system suitable for implementation of the embodiments of the invention disclosed in this specification.

FIG. 7 illustrates a schematic of an example computer or processing system that may implement the method for environment sensing and generating an environment information map in one embodiment of the present disclosure.

The computer system is only one example of a suitable processing system for implementing the modules 52, 54 and 62, and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for generating an environment information map using a wireless communication system, the wireless communication system comprising at least one transmitter and at least one receiver, at least one of the transmitter and receiver having a directional communication system, the method comprising:
    attempting a wireless communication link by transmitting a signal from a first transmitter to a receiver in a first beam direction;
    extracting a plurality of features resultant from the link attempt for the first beam direction and logging the plurality of extracted features at the receiver;

attempting at least one additional wireless communication link from the first transmitter to the receiver by transmitting a signal in a respective at least one additional beam direction;

extracting a plurality of features resultant from each of the at least one additional link attempts for each of the at least one additional beam directions and logging the plurality of extracted features at the receiver; and executing an inferencing algorithm using the plurality of extracted features from the first beam direction and the at least one additional beam directions to infer an environment information map of the area between the first transmitter and the receiver.

2. The method of claim 1, further comprising generating control signals for setting beam directions of the directional communication system of the first transmitter based on the environment information map to establish the communication link from the first transmitter to the receiver.

3. The method of claim 1, further comprising demodulating the signal received by the receiver as a result of each of the attempted wireless communication links and wherein the plurality of features are extracted from the demodulated signal.

4. The method of claim 3, wherein the plurality of features are communication link metrics extracted from the demodulated signal waveform.

5. The method of claim 1, wherein the plurality of features are extracted directly from the signal.

6. The method of claim 1, further including training at least one machine learning model based on the plurality of extracted features from the first beam direction and the at least one additional beam directions to infer the environment information map of the area between the first transmitter and the receiver, the at least one machine learning model including a first machine learning model for performing machine learning model scoring of inferences of the environment.

7. The method of claim 6, wherein the at least one machine learning model includes a second machine learning model located on a radio access network, the second machine learning model having an inference algorithm for performing machine learning model scoring of inferences of the environment.

8. The method of claim 7, wherein the first machine learning model is located on a front-end radio or a second transmitter, the front-end radio or second transmitter communicating between the receiver and the radio access network.

9. The method of claim 8, further comprising transferring the plurality of extracted features and the scored inferences from the front-end radio or second transmitter to the radio access network.

10. The method of claim 9, further comprising generating the control signals for setting beam directions of the directional communication system of the first transmitter based on the environment information map inferred using the second machine learning model and transferring the control signals from the radio access network to the first transmitter.

11. The method of claim 9, further comprising training the second machine learning model using sequence learning and temporal information obtained from the plurality of extracted features.

12. The method of claim 9, further comprising updating the first machine learning model based on the inferences learned by the second machine learning model.

13. The method of claim 1, wherein the directional communication system comprises at least one of beamforming, beam-steering and beam-shaping.

14. The method of claim 1, wherein the environment information map comprises at least one of localized inferences of, objects, weather conditions and air pollutants.

15. The method of claim 1, further comprising:
attempting a wireless communication link by transmitting a signal from the first transmitter to the receiver at a first power output level of the first transmitter and the receiver;

extracting a plurality of features resultant from the link attempt at the first power level and logging the plurality of features at the receiver;

attempting at least one additional wireless communication link from the first transmitter to the receiver in a respective at least one different output power level different from the first power output level of at least one of the first transmitter and the receiver;

extracting a plurality of features resultant from each of the at least one additional link attempts for each of the at least one different output power levels and logging the plurality of features at the receiver; and executing the inferencing algorithm using the plurality of extracted features from the at least one beam direction and the at least one output power level to infer a environment information map of the area between the first transmitter and the receiver.

16. The method of claim 14, further comprising:
attempting a wireless communication link from the first transmitter to the receiver at a first antenna polarization of the first transmitter and the receiver;

extracting a plurality of features resultant from the link attempt at the first antenna polarization and logging the plurality of features at the receiver;

attempting at least one additional wireless communication link from the first transmitter to the receiver at a respective at least one different antenna polarization, different from the first antenna polarization, of at least one of the first transmitter and the receiver;

extracting a plurality of features resultant from each of the at least one additional link attempts at each of the at least one different antenna polarizations and logging the plurality of features at the receiver; and executing the inferencing algorithm using the features at the at least one beam direction and at least one of the at least one output power level and the at least one antenna polarization to infer a environment information map of the area between the first transmitter and the receiver.

17. The method of claim 1, further comprising:
attempting a wireless communication link by transmitting a signal from a second transmitter to the receiver in at least one beam direction, and at one or more of at least one antenna polarization of the second transmitter and the receiver and at least one output power level of the second transmitter and the receiver;

extracting a plurality of features resultant from the link attempt at the least one beam direction, and one or more of the at least one antenna polarization of the second transmitter and the receiver, and at the least one output power level of the second transmitter and the receiver, and logging the plurality of features at the receiver;

extracting a plurality of features resultant from each of the at least one additional link attempts for each of the at the least one beam direction, and at one or more of the at least one antenna polarization of the second transmitter and the receiver and at the least one output power level of the second transmitter and the receiver and logging the plurality of communication link metrics at the receiver; and executing the inferencing algorithm using the plurality of features at the at least one beam direction and one or more of the at least one of the at least one output power level and the at least one antenna polarization to infer a environment information map of the area between the first transmitter and the receiver.

18. A computer system for generating an environment information map using a wireless communication system, the wireless communication system comprising at least one transmitter and at least one receiver, at least one of the transmitter and receiver having a directional communication system, the method comprising:

one or more computer processors;

one or more non-transitory computer-readable storage media;

program instructions, stored on the one or more non-transitory computer-readable storage media, which when implemented by the one or more processors, cause the computer system to perform the steps of:

attempting a wireless communication link by transmitting a signal from a first transmitter to a receiver in a first beam direction;

extracting a plurality of features resultant from the link attempt for the first beam direction and logging the plurality of extracted features at the receiver;

attempting at least one additional wireless communication link from the first transmitter to the receiver by transmitting a signal in a respective at least one additional beam direction;

extracting a plurality of features resultant from each of the at least one additional link attempts for each of the at least one additional beam directions and logging the plurality of extracted features at the receiver; and executing an inferencing algorithm using the plurality of extracted features from the first beam direction and the at least one additional beam directions to infer an environment information map of the area between the first transmitter and the receiver.

19. The computer system of claim 18, further including training at least one machine learning model based on the plurality of extracted features from the first beam direction and the at least one additional beam directions to infer the environment information map of the area between the first transmitter and the receiver, the at least one machine learning model including a first machine learning model having an inference algorithm for performing machine learning model scoring of inferences of the environment, wherein the at least one machine learning model includes a second machine learning model located on a radio access network, the second machine learning model having an inference algorithm for performing machine learning model scoring of inferences of the environment, wherein the first machine learning model is located on a front-end radio or a second transmitter, the front-end radio or second transmitter communicating between the receiver and the radio access network, and further comprising transferring the plurality of extracted features and the scored inferences from the front-end radio or second transmitter to the radio access network.

20. A computer program product comprising:

program instructions on a computer-readable storage medium, where execution of the program instructions using a computer causes the computer to perform a method of generating an environment information map using a wireless communication system, the wireless communication system comprising at least one transmitter and at least one receiver, at least one of the transmitter and receiver having a directional communication system, the method comprising:

attempting a wireless communication link by transmitting a signal from a first transmitter to a receiver in a first beam direction;

extracting a plurality of features resultant from the link attempt for the first beam direction and logging the plurality of extracted features at the receiver;

attempting at least one additional wireless communication link from the first transmitter to the receiver by transmitting a signal in a respective at least one additional beam direction;

extracting a plurality of features resultant from each of the at least one additional link attempts for each of the at least one additional beam directions and logging the plurality of extracted features at the receiver; and executing an inferencing algorithm using the plurality of extracted features from the first beam direction and the at least one additional beam directions to infer an environment information map of the area between the first transmitter and the receiver.

* * * * *